Figure 1:
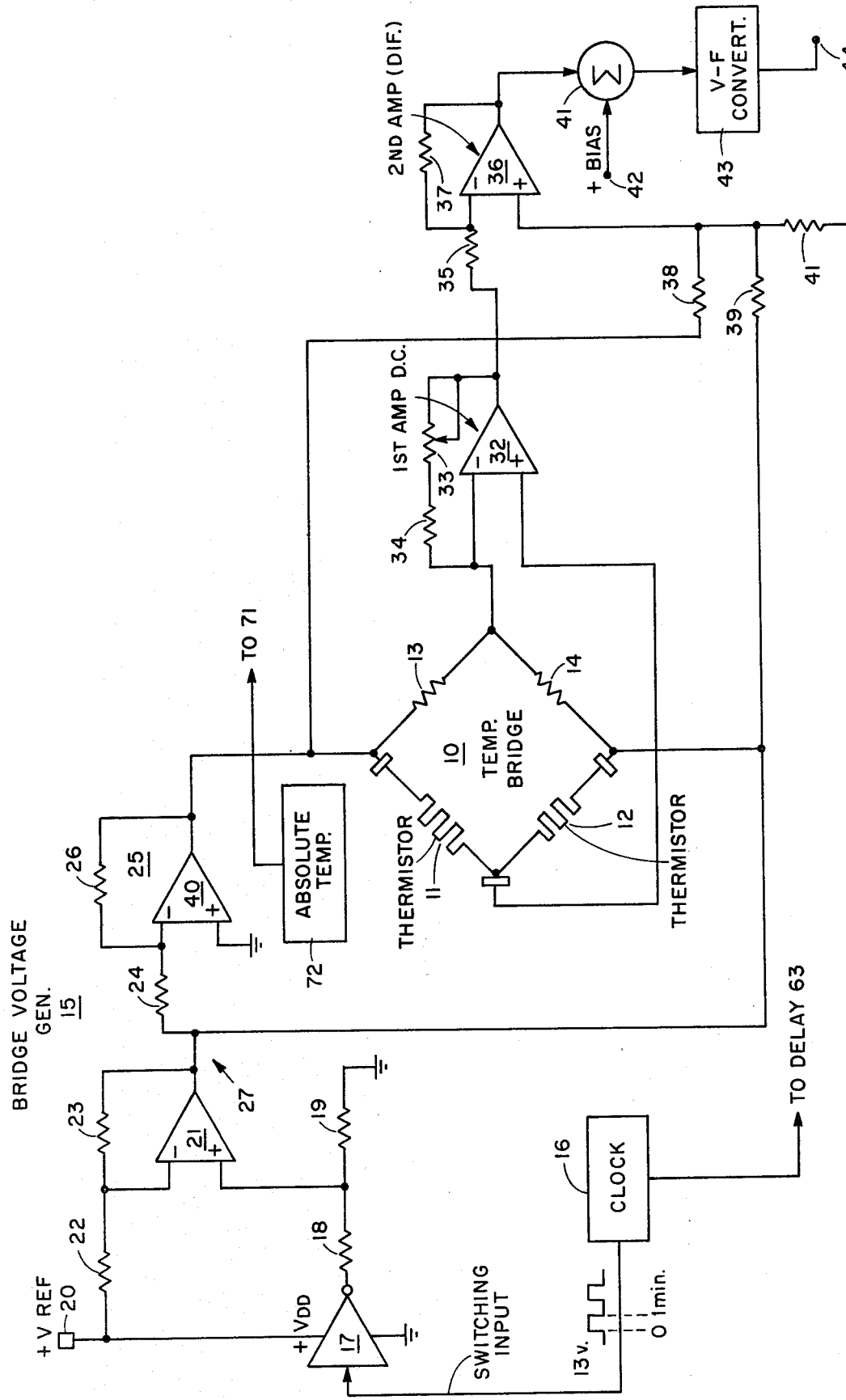

United States Patent [19]
Koehler

[11] 4,143,549
[45] Mar. 13, 1979

[54] TEMPERATURE MEASURING SYSTEM

[75] Inventor: Richard L. Koehler, Falmouth, Mass.

[73] Assignee: The United States of America as represented by the Secretary of the Navy, Washington, D.C.

[21] Appl. No.: 873,027

[22] Filed: Jan. 27, 1978

[51] Int. Cl.² ............................................. G01K 7/22
[52] U.S. Cl. .................................... 73/342; 323/75 N
[58] Field of Search ......................... 73/362 AR, 342; 323/75 N

[56] References Cited

U.S. PATENT DOCUMENTS

| | | | |
|---|---|---|---|
| 2,514,106 | 7/1950 | Thompson | 73/342 |
| 2,960,866 | 11/1960 | Pharo et al. | 73/342 |
| 3,417,619 | 12/1968 | Francis | 73/362 AR |
| 3,670,572 | 6/1972 | Devereaux et al. | 73/342 |
| 3,768,310 | 10/1973 | Krepak | 73/362 AR |

*Primary Examiner*—S. Clement Swisher
*Attorney, Agent, or Firm*—R. S. Sciascia; L. I. Shrago

[57] ABSTRACT

An arrangement for determining the temperature gradient within a fluid medium, which is used to ascertain the magnitude of vertical water movement, utilizes a pair of thermistors connected in a differential Wheatstone bridge that senses the temperature at two locations. The DC bridge driving voltage has its polarity periodically reversed for equal time intervals by a logic signal. The bridge output signal is converted to a variable frequency and counted during each of these different intervals in opposite directions. This subtraction process, which yields the temperature difference at the two locations, also, among other things, eliminates the effects of drift from the temperature measurement. The system also contains provisions for minimizing any offset caused by changes in the bridge driving voltage, amplifier offset instabilities and variations in other circuit components. There is also an overlap preventer circuit which prevents any miscount when the logic signal occurs at a particular time with respect to the transitions of the variable frequency signal that is being counted.

10 Claims, 2 Drawing Figures

TEMPERATURE MEASURING SYSTEM

The present invention relates generally to temperature measuring circuits and, more particularly, to apparatus for precisely measuring the temperature difference between two spaced locations within a fluid medium so as to provide an indication of the temperature gradient therein.

Recent oceanographic research has indicated the presence within the ocean of internal waves, and one technique for studying these waves and their accompanying vertical currents involves temperature difference measurements. In this regard, if the temperature versus depth in the ocean is known and this temperature is monotonically decreasing, them from the temperature at any point the depth at that point may be ascertained. At a fixed depth within the ocean, any vertical water displacement will cause a corresponding temperature change, and the magnitude of this change will be indicative of the distance of the movement. Consequently, if one determines the temperature gradient locally and any temperature changes, a measure of the vertical displacement of the water column can be obtained.

In order to detect comparatively small vertical current movements, temperature differences of $\pm 0.5°$ C. (Celsius) must be measured with an accuracy of $\pm 1m°$ C. (millidegree Celsius). The measurements additionally must be made over an ocean temperature background range of $0°$ to $30°$ C. Also, some of these measurements may have to be carried out at extreme ocean depths up to 6000 meters, and the apparatus involved must run continuously on batteries unattended for long periods of time and without any degradation in performance.

Prior art arrangements for measuring temperature differences generally employ sensors, such as thermistors, connected in bridge circuits. Most of these systems, for the most part, are unsatisfactory for the application mentioned above either because they consume excessive power, have insufficient stability, require frequent adjustments and maintainance or are of an undesirable size.

The measurement of ocean temperature differences of approximately $1m°$ C. involves the resolution of small differences between large quantitites. Thus, to measure such differences with any precision and consistency, one of the most important considerations must be that of reducing or minimizing any offset drift inherent in the measuring apparatus.

It is, accordingly, an object of the invention to provide apparatus for measuring the precise temperature difference existing at two spaced locations within a fluid medium.

Another object of the present invention is to provide an apparatus for measuring temperature differences wherein the measurements are made over extended periods of time with apparatus that has low power consumption, drift-free and possesses a high degree of stability and reliability.

Another object of the present invention is to provide apparatus for measuring temperature differences up to $\pm 500m°$ C. with an accuracy of $\pm 1m°$ C. over a range of $0°$ to $30°$ C. that operates with low power drain from a low voltage battery source.

Another object of the present invention is to provide an arrangement for ascertaining the temperature gradient within the ocean wherein the apparatus employed contains provisions for eliminating errors due to the offset drift caused by variations in the circuit energizing the temperature sensors or changes in the operating parameters of these sensors and other amplifiers and circuit elements associated therewith.

Figure 2:
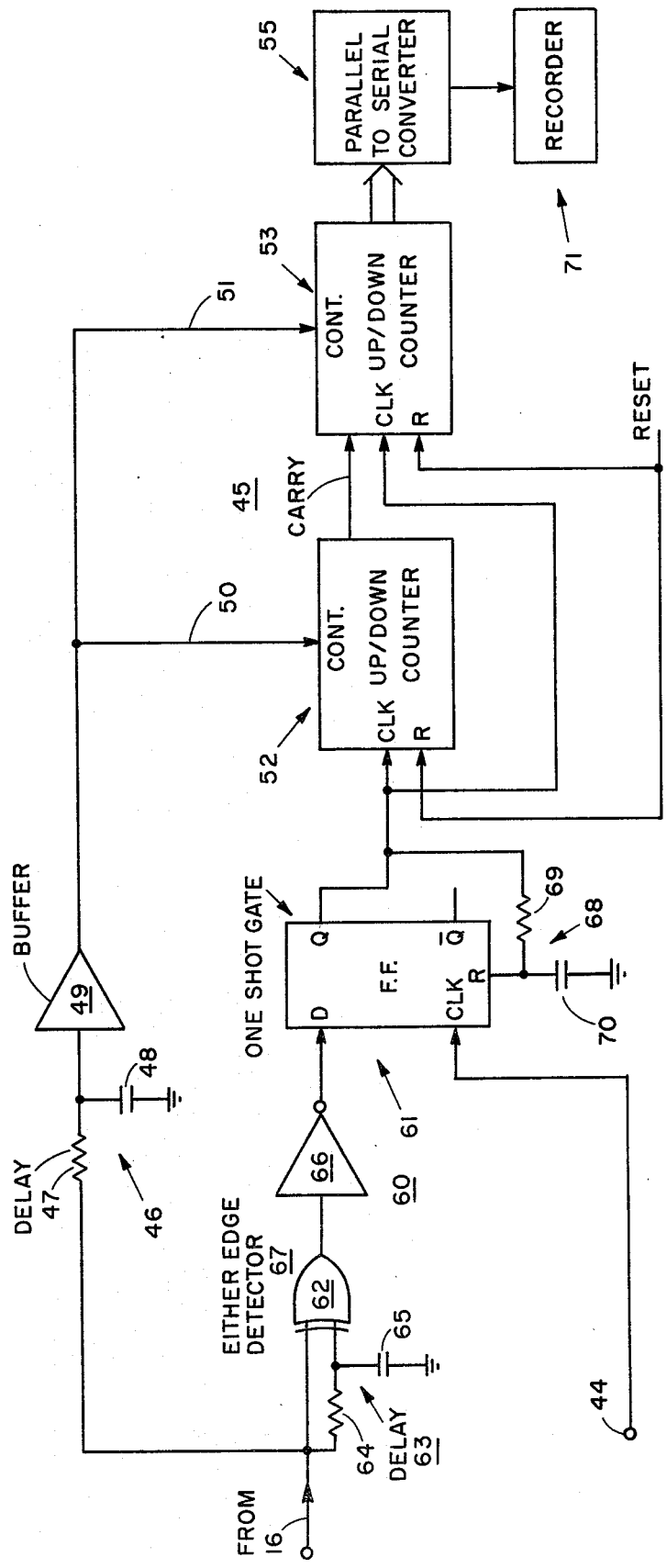

Other objects, advantages and novel features of the invention will become apparent from the following detailed description of the invention when considered in conjunction with the accompanying drawings wherein:

FIG. 1 is a schematic diagram showing a portion of the overall temperature measuring system including the temperature sensors; and FIG. 2 is a schematic diagram showing the remainder of the system including the overlap preventer.

Briefly, and in somewhat general terms, the above objects of invention are achieved according to one preferred embodiment of the invention by utilizing as the temperature sensors two aged 4000 ohm at $25°$ C. thermistors which are connected in a differential Wheatstone bridge. The amplifier bridge output, a DC signal, is converted to a corresponding frequency, and this frequency is counted for a predetermined period. Any errors introduced into the measurement by, for example, amplifier drift, are eliminated by reversing the polarity of the voltage energizing the bridge half-way through each measurement period and, at the same time, reversing the counting direction. This subtraction procedure eliminates any offset drift in the measuring circuit. The net count established after each measuring period is indicative of the temperature difference between the thermistor locations, and from this, the temperature gradient at this locale can be determined. The absolute temperature at each sensor is obtained from independent sensors located at one of the thermistor sites.

Referring now to FIG. 1 of the drawings, which shows a portion of the overall temperature difference measuring system, it will be seen that in this illustrative embodiment of the invention the temperature measuring apparatus includes a Wheatstone bridge 10 having as its arm elements thermistor 11, thermistor 12, resistor 13 and resistor 14. Thermistor 11 and 12 are specially aged 4000 ohm, potted thermistors in the form of two 0.1" diameter glass bead units having individual resistance values of 2000 ohms. They are selected such that the sum of their resistance does not vary by $\pm 0.5$ percent or $\pm 100m°$ C. at $25°$ C. The close matching of sensors is desirable since it permits their interchangeability in the temperature difference bridge 10.

In one particular case, thermistors 11 and 12 were aged at $300°$ C. and at $200°$ C. for a week at each temperature and, thereafter, monitored at $125°$ C. until they stopped changing. They were also subjected to a thermal cycle process by being repeatedly immersed into boiling water, ice water, dry ice and alcohol until no change was observed in their characteristics. This latter process required 4 to 10 cycles.

Resistors 13 and 14 are of equal magnitude, and it is this equality with that of the thermistors that results in the Wheatstone bridge 10 operating in a differential manner. Thus, when energized with a DC voltage, bridge 10 will produce an output signal having a magnitude proportional to the difference in the resistances exhibited by the thermistors and a polarity determined by the relative values of these resistances.

Temperature bridge 10 is driven with a DC voltage whose polarity is periodically reversed by a logic level signal. The complete bridge is thus switched in contrast with prior art arrangements, such as the stabilized amplifier, where only the output of the bridge is reversed. The reason for switching the bridge is to prevent any transient voltages caused by the switching action from reaching other portions of the system and introducing errors in the counting operation. The necessary attenuation required to minimize these transients is accomplished by the bridge circuit itself which has a gain factor of 0.1 or less.

The bridge voltage drive circuit, represented by reference character 15, includes an inverter 17 having its output connected to a bipolar voltage generator 27. Inverter 17 is controlled by clock 16 which produces the switching pulses and thereby, in effect, establishes the equal up/down intervals of each counting period mentioned above.

The output of inverter 17 is connected by resistor 18 to the non-inverting input terminal of amplifier 21. This terminal is connected to resistor 19, the opposite end of which is grounded. The operating reference potential for the drive circuit is available at positive voltage terminal 20, and in one particular embodiment, this source was an 8 volt battery. This DC voltage supply is connected to inverter 17 in the usual manner and through resistor 22 to the inverting terminal of amplifier 21. A feedback resistor 23 is connected between the output of amplifier 21 and its inverting terminal.

The output of amplifier 21 is coupled via resistor 24 to the inverting terminal of operational amplifier 40. This amplifier also has a feedback resistor 26 connected between its output and inverting terminal, and its non-inverting terminal is grounded.

The operation of the bridge drive voltage circuit is as follows: When the switching signal produced by clock 16 is high at 13 volts, inverter 17 produces a zero output signal which appears at the non-inverting terminal of operational amplifier 21, and this amplifier now operates in its normal manner. With an 8 voltage reference input to its inverting terminal derived from source 20, its output is at −0.2 volts.

When the switching signal is at a zero voltage level, a condition which makes the output of inverter 17 equal to the voltage at its $+V_{DD}$ terminal, the 8 volt reference voltage, the input to the non-inverting terminal of operation amplifier 21 increases to a level determined by the resistance values of the voltage divider made up of resistors 18 and 19. The output of amplifier 15 now follows this signal with a gain determined by resistors 22 and 23. By increasing the positive input high enough, this output will increase from −0.2 volts to +0.2 volts. In this regard, the action of the voltage divider is to insure that the output exactly equals +0.2 volts. Thus, with the switching signal at +13 volts, the output of amplifier 21 is at −0.2 volts. With the switching signal at zero volts, it is at +0.2 volts.

Inverter 25 has a gain of −1 and consists of an operational amplifier 40 and input resistor 24 and feedback resistor 26. It operates in a conventional manner and, consequently, its output is a signal whose polarity is opposite that of the signal, here from amplifier 21, coupled to its input resistor 24. Thus, when the latter signal is at +0.2 volts, the inverter produces a signal at −0.2 volts. Likewise, the inverter changes a −0.2 volts to a +0.2 volts signal.

The output of inverter 25 is coupled to one junction 30 of the bridge 10 that is formed by thermistor 11 and resistor 13, while the output of operational amplifier 21 is connected to an opposite junction 31, the one formed by thermistor 12 and resistor 14. This arrangement, it will be appreciated, provides a DC drive for the bridge with the polarity of the voltage being reversed in accordance with the composition of the switching pulses from clock 16.

The bridge drive voltage is balanced with respect to ground. This balanced drive voltage reduces the effect of shunt resistance from the center of the temperature bridge to ground relative to any unbalanced bridge drive. In this regard, a 0.2 megohm shunt resistance will cause a 1m° C. error in a bridge with a balance drive and having 4000 ohm thermistors that are matched only to 100m° C. A 100 megohm shunt resistance will cause the same error for an unswitched unbalanced drive. Consequently, the bridge with balance drive is approximately 500 times less sensitive to shunt resistance from the center of the bridge to ground than is a similarly constructed bridge with unbalanced drive.

The output signal from temperature bridge 10 has an amplitude indicative of the temperature difference between the two locations within the fluid medium occupied by thermistors 11 and 12. However, this signal, because of its DC nature, will be influenced by any drifts occurring in the amplifiers utilized in the bridge drive voltage circuit, any variations in the parameters of the thermistors and other instabilities occurring in the various other components of the drive and switching circuits.

The bridge output signal is directly coupled to the inverting and non-inverting terminals of an operational amplifier 32 which has a potentiometer 33 and a series resistor 34 in a negative feedback path. The output from this first amplifier is coupled by resistor 35 to the inverting terminal of a second operational amplifier 36 which operates in a differential mode. Amplifier 36 also has a feedback resistor 37 connected between its output and inverting terminal. The signal at its non-inverting terminal is derived from the bridge drive voltage, and in this regard, resistor 38 connects this terminal too corner 30 of the bridge while resistor 39 connects it to the opposite corner 31. This terminal is connected through resistor 41 to ground.

Amplifier 32 is arranged to operate as a follower with a gain in order to possess a high input impedance and not, consequently, load the temperature bridge. It would be mentioned that resistors 13 and 14 are critical to the stability of the temperature difference circuit. In one particular modification, they were Vishay oil-filled hermetically sealed resistors having a stability of 5ppm/yr (parts per million per year) and an accuracy of 10ppm. It is more important that these resistors be matched to each other rather than that they have some particular value. For example, a difference of 60ppm between these resistors would introduce a 1m° C. bridge error from this source alone.

The parallel combination of bridge resistors 13 and 14 forms one of the gain determining resistors of amplifier 32, the other being the series combination of potentiometer 33 and resistor 34. Potentiometer 33 provides compensation for scale factor changes caused by errors in gain of both amplifier stages and the bridge drive level.

The gain adjustment range is limited to about 1 percent so that the worst case instability of 2 percent in the potentiometer setting only causes a 0.02 percent change in scale factor. The gain of amplifier 32 is $$G = \frac{R_a}{R_b} + 1 \quad (1)$$

where $R_a$ equals the series resistance of 33 and 34, and $R_b$ equals the parallel resistance of resistors 13 and 14.

Input amplifier 32 has a low common mode rejection of only 80 so that it is sensitive to the balance of the bridge drive voltage. The ratio of the gain of the amplifier to bridge output to the common mode gain is $$\frac{\text{Amp. Gain}}{\text{Com. Mode Gain}} = \frac{G}{1} = G = 80 \quad (2)$$

Output amplifier 36, as mentioned hereinbefore, operates in a differential mode and provides an additional gain to amplify only the difference between the output of amplifier 32 and the average value of the bridge drive thereby providing an overall infinite common mode rejection.

It would be noted in connection with the operation of this amplifier that the input signal to the inverting terminal, which is derived from amplifier 32, contains the troublesome unbalance from the bridge voltage drive and that the input signal to the non-inverting terminal, which is derived from the voltage divider made up of resistors 38 and 39, contains the bridge drive voltage unbalance. Thus, one offset neutralizes another offset, and an improved mode of operation is realized.

The accuracy of the substraction process is in the order of the accuracy of the resistors used which is 0.01 percent. Thus, the common mode rejection of amplifier stage 36 is about 10,000 or 80dB. This, taken with the common mode rejection for stage 32 to about 80 provides an overall figure of 114dB which is more than sufficient to handle any small imbalance in the bridge drive and eliminates the need to make any adjustment in the bridge drive balance.

The output of amplifier 36 is coupled to summer 41 which has a positive bias voltage applied thereto from an appropriate voltage supply 42. This summer biases the input signal to the voltage frequency converter 43 so that it can accept the bipolar output from amplifier 36. This bias and any offset in the converter are eliminated from the final measurement by the subtraction process performed by the consecutive equal up/down counting cycles. The bias also maintains the converter normally at midscale. Converter 43, it would be mentioned, preferably should operate in a linear manner, however, it need not have this characteristic to cancel any offsets. Although not shown, converter 43 and the bridge voltage generator utilize the same reference voltage, and this prevents any change in scale factor should this voltage vary.

The voltage-to-frequency converter 43 is of conventional design and produces an output signal at terminal 44 whose frequency is directly proportional to the magnitude of its DC input signal.

As seen in FIG. 2, the variable frequency signals produced by converter 43 are coupled to a one-shot flip-flop 61 while the clock signals are coupled to a 2 microsec. delay circuit 46 consisting of series resistor 47 and a shunt capacitor 48. The delayed clock signals go to a buffer amplifier 49 and, thereafter, they are applied to the control lines such as 50, 51 of a number of up/down serially connected counting stages shown here as 52, 53 which form the complete counter 45. When the measurement is completed, it would be pointed out, the data in the counter is parallel shifted to serial shift registers and then stored in recorder 71. Thereafter, the complete counter is reset to zero prior to the next measurement interval.

The overall system includes a provision for preventing any malfunction or counting error should the count direction change simultaneously with the occurrence of a clock pulse. Normally, if such a condition occurs, some of the counter stages will count up and others down. Circuit 60 prevents this from happening.

In the operation of the system of FIG. 2, when the signal appearing at the control lines 50, 51 of the up/down counting stages is high, counter 45 will increment for each positive edge of the signal present at its clock terminal and when it is low, it will decrement for this edge. Should a positive clock edge occur at the same time as one of the transitions at these lines, counting stages 50 and 51 may switch from up/down counting at slightly different times. These times may differ by 0.1 to 0.3 microsec. The consequence of this is that an erroneous count will be accumulated that may be wrong by more than just one count. This is because the rule for counting up is different from that of counting down and because any of the various counting stages along the cascaded counter chain may be involved.

Signals from the voltage-to-frequency converter 43 apearing at terminal 44 are coupled to a one-shot flip-flop 61, and the output pulse produced is applied to the synchronous clock terminal of the counting stages 52 and 53. Flip-flop 61 acts as a gate so that these pulses can be turned "on" or "off" without creating a positive going edge at this terminal. The signal fed to this terminal is derived from clock 16 which is directly coupled to one input of an exclusive OR gate 62 and indirectly coupled to a second input of this gate via a 10 microsec. delay circuit 63 made up of series resistor 64 and shunt capacitor 65. The output of gate 62 is fed to an inverter 66 and then applied to the D terminal of flip-flop 61.

Delay circuit 63, exclusive OR gate 62 and inverter 66 constitute an either edge detector 67. When the control lines to the various counting stages, such as 50 and 51, are changed from a high to a low state or vice versa by clock signal 16, the either edge detector 62 creates a low output signal for a predetermined period of time, and this prevents triggering the one-shot flip-flop 61 for this interval.

In the operation of the overlap preventer, assume, for example, that the signal at terminal 16 is experiencing a change from a high to a low level and the input to gate 62 is, therefore, low. The other input to this gate likewise goes low, but this will occur after a 10 microsec. delay. During this interval, the exclusive OR output after inversion in circuit 66 will be low at the D terminal of flip-flop 61. Thus, the gated one-shot circuit is inhibited for 10 microsec. after the transition of the up/down signal. After the 10 microsec. delay, as will be appreciated, one-shot gate is enabled and pulses can get through to the counting stages.

If the signal at the control lines of the various counting stages changes state and the voltage-to-frequency counters output pulse present at terminal 44 triggers the gated one-shot circuit, ordinarily it is not necessary to change the conditions at the counters. Thus, a 2 microsec. delay provided by circuit 46 is used so as to prevent the counters from changing their count direction until after the effects of any clock pulse positive edge have subsided. The duration of the one-shot pulse is established by the 2 microsec. delay circuit 68 consisting of resistor 69 and capacitor 70 associated with flip-flop 61.

To summarize the operation of the overall system, thermistors 11 and 12, positioned at two spaced locations within the fluid medium and connected in a differential Wheatstone bridge 10, sense the temperature at these locations. Bridge 10 produces a DC signal whose magnitude is proportional to the difference between the resistances of these thermistors at the temperature at the sites. The polarity of this signal is periodically reversed for equal time intervals, and this is accomplished by clock 16 that effectively reverses the polarity of the DC voltage driving the bridge. The bridge output signal is amplified in an arrangement wherein one offset present due to the bridge drive signal is neutralized by another. Thereafter, the signal is converted to a variable frequency signal which is counted in opposite directions for equal periods of time established by the logic signal from the clock. This subtraction process eliminates any offset drive introduced by the measurement circuitry and results in a more accurate and precise temperature measurement.

The absolute temperature in the vicinity of the temperature bridge 10 where the current movement is to be determined is measured by any well known apparatus, such as a resistance thermometer or thermistor, and the signal representing this temperature is supplied to recorder 71 for simultaneous recording with the temperature differential readings. The absolute temperature may also be used after the data is collected to correct the small temperature dependence of the thermistor bridge offset and scale factor.

What is claimed is:

1. Apparatus for use in determining the temperature gradient within a fluid medium, comprising in combination a differential Wheatstone bridge having a thermistor in a pair of its arms,
   said bridge being positioned within said fluid medium such that said thermistors sense the temperatures at two spaced locations;
   means for energizing said bridge with a DC voltage of a predetermined magnitude and of a polarity which is different during alternate equal time intervals;
   means for converting the DC output signal from said bridge into a signal whose frequency varies in accordance with the magnitude of said DC output signal; and
   means for indicating the difference in the number of cycles of the variable frequency signal that is produced by said last-mentioned converting means during a consecutive pair of said equal time intervals,
   said difference being indicative of the difference in the temperatures at said two locations and being unaffected by any changes in the magnitude of the DC voltage energizing said bridge.

2. In an arrangement as defined in claim 1 wherein the DC voltage energizing said bridge is balanced with respect to a reference voltage.

3. In an arrangement as defined in claim 1 wherein said means for indicating the difference in the number of cycles of the variable frequency signal includes an up-/down counter; and
   means for controlling said counter such that its direction of count is in one direction when the voltage energizing said bridge has one polarity and in an opposite direction when the voltage energizing said bridge has a different polarity.

4. In an arrangement as defined in claim 3 means for preventing the registering of any change in the count in said counter when the variable frequency signal experiences a transition at the same time the polarity of the DC voltage energizing said bridge changes.

5. In a system for providing an indication of the temperatures at two spaced locations within a fluid medium, the combination of
   a differential Wheatstone bridge having a thermistor in one pair of arms and a resistor in the other pair of arms,
   said thermistors being adapted to sense the temperatures at two spaced locations;
   means for energizing said bridge with a balanced DC driving voltage which has a different polarity during alternate time intervals of equal preselected length;
   means for converting the DC output signal from said bridge into a signal whose frequency varies in accordance with the magnitude of said DC output signal;
   means for counting in one direction the number of cycles of the variable frequency signal that is produced by said last-mentioned means during a first time interval and for counting in an opposite direction the number of cycles of this variable frequency signal that occur during a second time interval;
   said first and second time intervals being of said preselected length,
   the difference between the counts so obtained being indicative of the difference between the temperatures at said two locations and being uninfluenced by changes in the magnitude of the DC voltage energizing said bridge; and
   means for recording said difference.

6. In a system as defined in claim 5 wherein the resistors in the other pair of bridge arms are of equal magnitude and of similar construction.

7. In a system as defined in claim 5 means for inhibiting the counting for a predetermined interval when the variable frequency signal undergoes a transition concurrently with a change in the polarity of the DC driving voltage.

8. Apparatus for use in determining the temperature gradient within a fluid medium, comprising in combination
   a differential Wheatstone bridge having a thermistor in two of its arms,
   said thermistor being adapted to sense the temperatures at two spaced locations within the fluid medium;
   means for applying across a pair of opposite corners of said bridge a DC voltage of a predetermined magnitude that is balanced with respect to a reference potential;
   means for reversing the polarity of said DC voltage at predetermined times which are separated by equal time intervals;
   a differential amplifier;
   means for coupling the output signal of said bridge to one input of said amplifier and a signal proportional to said DC voltage to the other input of said amplifier;
   means for converting the output signal of said differential amplifier to a variable frequency signal, the frequency of said last-mentioned signal being proportional to the magnitude of the output signal from said amplifier;
an up/down counter;
means for coupling said variable frequency signal to said counter;
means for controlling the counting direction of said counter such that the net count registered therein after two of said time intervals which are consecutive corresponds to the difference in the number of cycles of said variable frequency signal that occur during said time intervals; and
means for recording said net count.

9. In an arrangement as defined in claim 8 means for controlling said counter such that it does not count any cycle of said variable frequency signal that has a transition that occurs at the same time the polarity of said DC voltage is reversed.

10. In an arrangement as defined in claim 8 wherein said differential Wheatstone bridge has a resistor in the other two of its arms,
said resistors being of similar construction and of equal value.

* * * * *